United States Patent [19]

Kimura

[11] Patent Number: 5,371,793
[45] Date of Patent: Dec. 6, 1994

[54] DATA STORAGE DEVICE AND METHOD OF ACCESSING THE DATA STORAGE DEVICE

[75] Inventor: Masatoshi Kimura, Itami, Japan

[73] Assignee: Mitsubishi Denki Kabushiki Kaisha, Tokyo, Japan

[21] Appl. No.: 86,891

[22] Filed: Jul. 7, 1993

[30] Foreign Application Priority Data

Jul. 10, 1992 [JP] Japan .................. 4-183901

[51] Int. Cl.⁵ ............................................ H04L 9/00
[52] U.S. Cl. ............................................ 380/4; 380/3;
380/23; 380/24; 380/25; 380/49; 380/50;
235/379; 235/380; 340/825.31; 340/825.34;
365/189.07
[58] Field of Search ................... 380/3, 4, 23, 24, 25,
380/49, 50; 235/379, 380, 382; 340/825.31,
825.34; 365/189.07, 195, 201

[56] References Cited

U.S. PATENT DOCUMENTS

| 4,007,355 | 2/1977 | Moreno ..................... 235/61.7 |
| 4,903,299 | 2/1990 | Lee et al. ..................... 380/25 |
| 5,216,633 | 6/1993 | Weon et al. ............... 365/189.07 |
| 5,237,609 | 8/1993 | Kimura ....................... 380/3 |

FOREIGN PATENT DOCUMENTS

| 0483978 | 5/1992 | European Pat. Off. ....... G07F 7/12 |
| 2266222 | 10/1975 | France .......................... G06K 5/00 |
| 2637710 | 4/1990 | France .......................... G06F 15/21 |
| 4137336 | 5/1992 | Germany ...................... G06K 19/07 |
| 58-57784 | 12/1983 | Japan ............................. G06F 13/00 |
| 58-57785 | 12/1983 | Japan ............................. G06F 13/00 |
| 60-1666 | 1/1985 | Japan ............................. G06F 15/30 |
| 60-9308 | 3/1985 | Japan ............................. G06F 15/21 |

*Primary Examiner*—Bernarr E. Gregory
*Attorney, Agent, or Firm*—Leydig, Voit & Mayer

[57] ABSTRACT

A semiconductor data storage device has a common memory for storing processed data, an attribute memory for storing attribute data, a buffer circuit connected to a bus of the common memory and a bus of the attribute memory, and a control circuit connected to the bus of the common memory and the bus of the attribute memory for accessing each of the common memory and the attribute memory. The control circuit controls connection and isolation of the buffer circuit. According to a method of accessing the semiconductor data storage device, when a secret code is input from the terminal unit through the buffer circuit, the control circuit isolates the buffer circuit, thereafter compares the secret code with an identification code stored in the attribute memory, and sets the buffer circuit in the connected state to allow the terminal unit to access the common memory if the secret code and the identification code coincide with each other and maintains the buffer circuit in the isolated state to inhibit the terminal unit from accessing the common memory if the secret code and the identification code do not coincide with each other.

10 Claims, 5 Drawing Sheets

F I G. 2
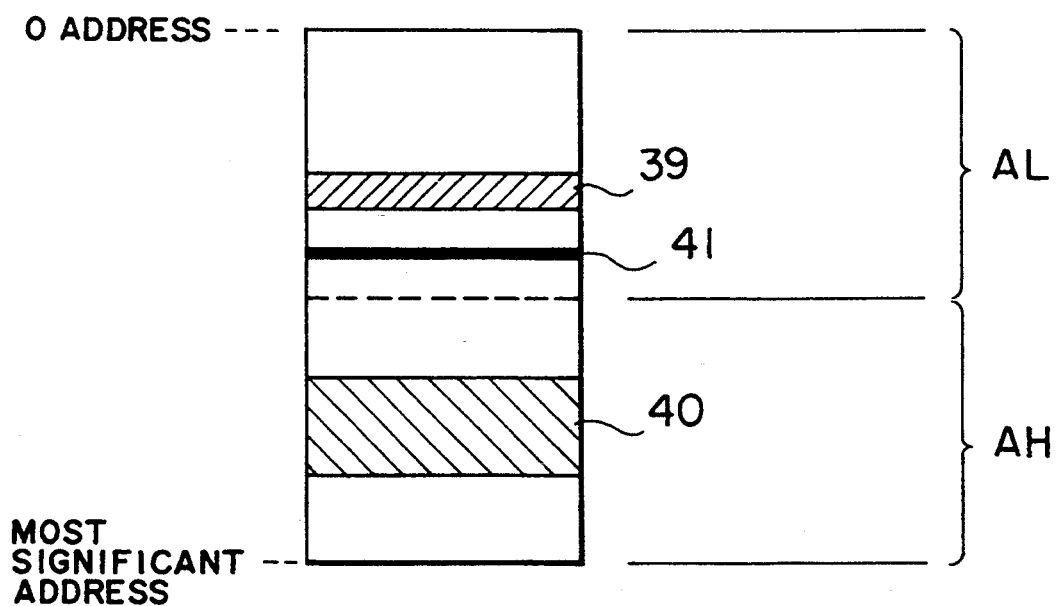

DATA STORAGE DEVICE AND METHOD OF ACCESSING THE DATA STORAGE DEVICE

BACKGROUND OF THE INVENTION

1. Field of the Invention

This invention relates to a data storage device and, more particularly, to a storage device incorporating a data common memory and an attribute memory. This invention also relates to a method of accessing such a data storage device.

2. Description of the Related Art

FIG. 5 shows a conventional portable semiconductor data storage device. The data storage device has a common memory 1 formed of a volatile memory, such as a static random access memory (SRAM), and an attribute memory 2 formed of a non-volatile memory, such as an electrically erasable/programmable random access memory (EEPROM). The common memory 1 stores data processed in the memory system, and the attribute memory 2 stores to store attribute data of the data storage device. When the voltage of a power input line 14 becomes equal to or higher than a prescribed voltage after this storage device has been connected to a terminal unit (not shown) and supplied with power from the terminal unit through the power input line 14, a power supply control circuit 5 connects the power input line 14 to an internal power supply line 15 and sends a memory backup protection signal at high level to a first chip selection signal input terminal S1 of the common memory 1 through a signal line 16.

In this state, the terminal unit can access the common memory 1 or the attribute memory 2. To access the attribute memory 2, both a memory chip enable signal on a signal line 11 and a register signal on a signal line 12 are set to low level. Then, a chip selection signal at low level is supplied to a chip selection signal input terminal $\overline{S1}$ of the attribute memory 2 through a gate circuit 7 for selecting the attribute memory 2, while a chip selection signal at high level is supplied to a second chip selection signal input terminal $\overline{S2}$ of the common memory 1 through a gate circuit 6. The attribute memory 2 is thereby selected and the terminal unit is enabled to perform writing/reading in the attribute memory 2 through an address bus 8, a write enable signal line 9, an output enable signal line 10, a data bus 13, an input buffer circuit 3 and an input/output buffer circuit 4.

To access the common memory 1, the memory chip enable signal on the signal line 11 and the register signal on the signal line 12 are set to low level and high level, respectively. Then, the chip selection signal at low level is supplied to the second chip selection signal input terminal $\overline{S2}$ of the common memory 1 through the gate circuit 6 for selecting the common memory, while the chip selection signal at high level is supplied to the chip selection signal input terminal $\overline{S1}$ of the attribute memory 2 through the gate circuit 7. The common memory 1 is thereby selected and the terminal unit is enabled to perform writing/reading in the common memory 1 through the address bus 8, the write enable signal line 9, the output enable signal line 10, the data bus S3, the input buffer circuit 3 and the input/output buffer circuit 4.

The operation when in a case where the power supply from the terminal unit is stopped or the voltage of the power input line 14 is lower than the prescribed level will be described. In such a case, the power supply control circuit 5 disconnects the power input line 14 and the internal power supply line 15 and supplies the memory backup protection signal at low level to the first chip selection signal input terminal S1 of the common memory 1 through the signal line 16 to back up the common memory 1. At this time, electric power is supplied to the common memory 1 from a primary battery 26 incorporated in the data storage device through an excess current protection resistor 25, a reverse charge prevention diode 24 and the internal power supply line 15, whereby data stored in the common memory 1 is maintained. Since the attribute memory 2 is a nonvolatile memory, data stored therein is not changed.

An output enable signal on the signal line 10 is input through the input buffer circuit 3 and is thereafter supplied as a memory output enable signal to the attribute memory 2 through a signal line 19. Simultaneously, this signal is supplied to a DIR terminal of the input/output buffer circuit 4 to effect direction control of the input/output buffer circuit 4. Also, the memory chip enable signal on the signal line 11 is supplied to a G terminal of the input/output buffer circuit 4, and the input/output buffer circuit 4 is set in an enabled state when one of the common memory 1 and the attribute memory 2 is selected, that is, the memory chip enable signal is at low level.

Thus, the data storage device, reading/writing in the common memory 1 or the attribute memory 2 can be performed freely by controlling the memory chip enable signal on the signal line 11 and the register signal on the signal line 12, if the voltage of the power input line 14 is equal to or higher than the prescribed level. There is therefore a risk that irreplaceable or valuable stored data may be altered, copied or forged.

SUMMARY OF THE INVENTION

In view of this problem, an object of the present invention is to provide a semiconductor data storage device capable of preventing copying, forgery and alteration of stored data.

Another object of the present invention is to provide an access method which ensures that data stored in a semiconductor data storage device can be protected from copying, forgery and alteration thereof.

To achieve these objects, according to one aspect of the present invention, there is provided a semiconductor data storage device comprising a common memory for storing processed data, an attribute memory for storing attribute data, buffer means connected commonly to a bus of the common memory and a bus of the attribute memory, and control means connected to the bus of the common memory and the bus of the attribute memory for accessing each of the common memory and the attribute memory for controlling connection/isolation of the buffer means.

According to another aspect of the invention, there is provided a method of accessing a semiconductor data storage device, comprising storing an identification code in an attribute memory incorporated the semiconductor data storage device, disconnecting a bus of a common memory of the semiconductor data storage device and a terminal unit from each other when a secret code is input from the terminal unit, collating the secret code and the identification code with each other, connecting the bus of the common memory to the terminal unit to allow access to the common memory if the secret code and the identification code coincide with each other, and maintaining the bus of the common memory and the terminal unit in the disconnected state to inhibit the terminal unit from accessing the common memory if the secret code and the identification code do not coincide with each other.

In the semiconductor data storage device in accordance with the present invention, the control means controls the connection/isolation of the buffer means and accesses the common memory and the attribute memory.

In the method of accessing the semiconductor data storage device in accordance with the present invention, when a secret code is input from a terminal unit, the secret code is collated with the identification code previously stored in the attribute memory, while the bus of the common memory and the terminal unit are disconnected from each other, and the bus of the common memory is connected to the terminal unit to allow access to the common memory if the two codes coincide with each other, or the bus of the common memory and the terminal unit are maintained in the disconnected state to inhibit the terminal unit from accessing the common memory if the two codes do not coincide with each other.

BRIEF DESCRIPTION OF THE DRAWINGS

FIG. 2 is a diagram of memory areas of an attribute memory used in the embodiment shown in FIG. 1;

DESCRIPTION OF THE PREFERRED EMBODIMENTS

Figure 1:
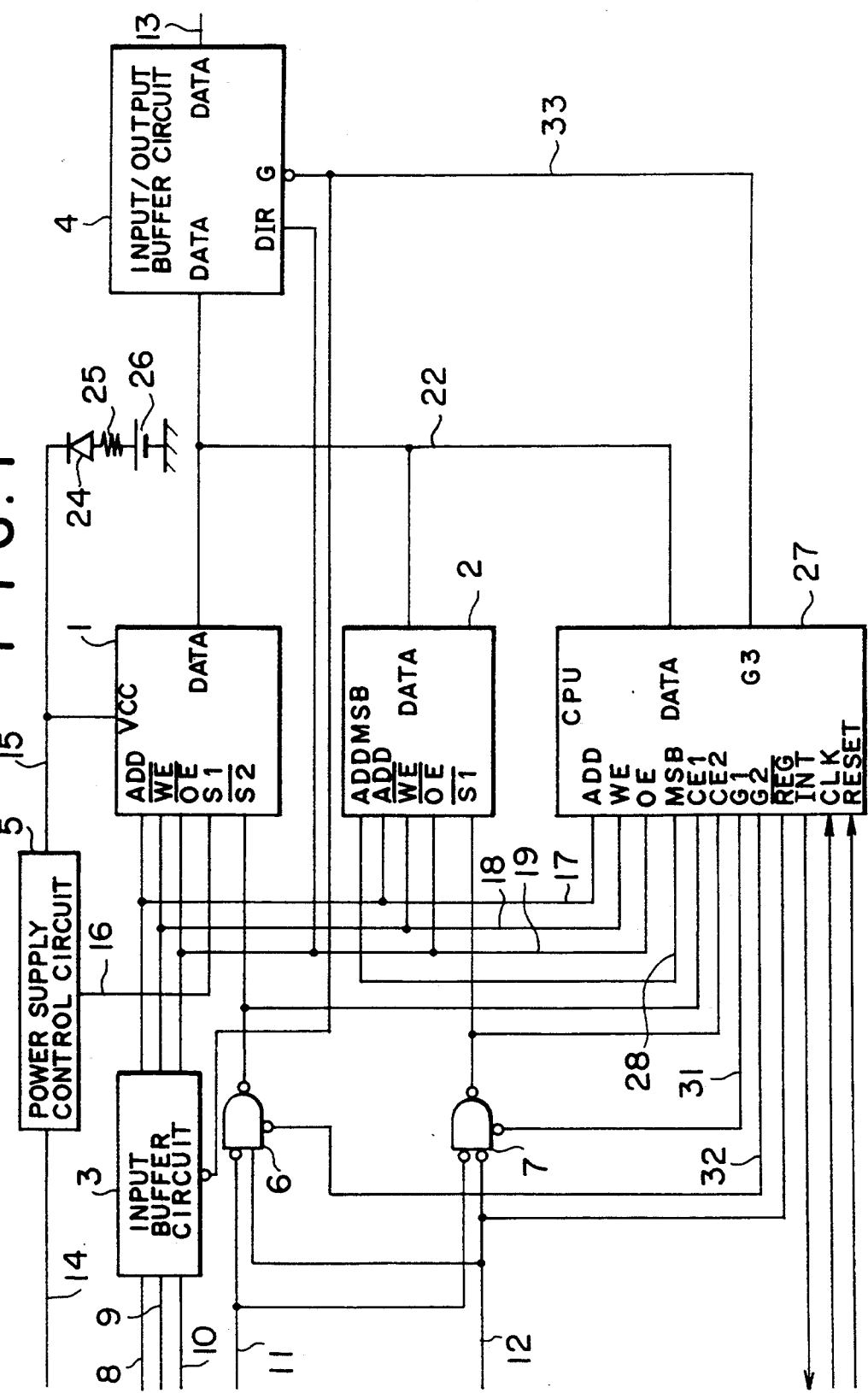
FIG. 1 is a block diagram of a semiconductor data storage device in accordance with an embodiment of the present invention.

In a portable semiconductor data storage device in accordance with an embodiment of the present invention shown in FIG. 1, an input buffer circuit 3 and an input/output buffer circuit 4 are both connected in common to a common memory 1 including a volatile memory, such as an SRAM, and an attribute memory 2 including a non-volatile memory, such as an EEPROM. A power supply control circuit 5 is connected to the common memory 1 through an internal power supply line 15, and a power input line 14 is connected to the power supply control circuit 5. A primary battery 26 for a backup operation is connected to the internal power supply line 15 through a reverse charge prevention diode 24 and an excess current protection resistor 25. The power supply control circuit 5 is connected to a first chip selection signal input terminal S1 of the common memory 1 through a signal line 16. A memory chip enable signal line 11 and a register signal line 12 are connected to each of gate circuits 6 and 7. Output terminals of the gate circuits 6 and 7 are connected to a second chip selection signal input terminal $\overline{S2}$ of the common memory 1 and a chip selection signal input terminal $\overline{S1}$ of the attribute memory 2, respectively.

This data storage device has a central processing unit (CPU) 27 a control means in accordance with the present invention. Buses of the common memory 1 and the attribute memory 2 are respectively connected to corresponding input/output ports of the CPU 27. That is, a memory address line 17 from the common memory 1 and the attribute memory 2 is connected to an ADD port of the CPU 27, a memory write enable signal line 18 is connected to a WE port, a memory output enable signal line 19 is connected to an OE port, and a memory data bus 22 is connected to a DATA port. A most significant bit address signal input terminal ADDMSB of the attribute memory 2 is connected to an MSB port of the CPU 27, and the second chip selection signal input terminal $\overline{S2}$ of the common memory 1 and the chip selection input terminal $\overline{S1}$ of the attribute memory 2 are connected to a CE1 port and a CE2 port of the CPU 27, respectively.

Control terminals of the gate circuits 6 and 7 are respectively connected to a G1 port and a G2 port for gate control of the CPU 27. A G terminal of each of the input buffer circuit 3 and the input/output buffer circuit 4 are connected to a G3 port of the CPU 27. When a high level signal is output through each of the G1 port, G2 port and G3 port, the corresponding output terminal of the input buffer circuit 3, the input/output buffer circuit 4 and the gate circuits 6 and 7 are floated. Further, the register signal line 12 is connected to a $\overline{REG}$ port of the CPU 27. The CPU 27 also has a CLK port and a RESET port for being supplied with a clock signal and a reset signal from a terminal unit, and an INT port for outputting an interrupt signal to a terminal unit.

FIG. 2 shows memory areas of the attribute memory 2. If a most significant bit address signal 28 output from the MSB port of the CPU 27 to the terminal ADDMSB of the attribute memory 2 is set to low level, a lower half area AL becomes an accessible area. If the signal 28 is set to high level, an upper half area AH becomes an accessible area. It is assumed here that a card identification code 40 representing this data storage device is stored in the upper area AH. The card identification code 40 is registered and stored in the attribute memory 2 by a test program or the like at a stage in the process of manufacturing the storage device. In the lower area AL, attribute data necessary at the time of accessing from a terminal unit to the common memory 1, e.g., data representing the kind, the capacity and the access speed of the common memory 1, is stored.

The operation of this embodiment will be described below. The data storage device is connected to a terminal unit (not shown) to be supplied with power from the terminal unit through the power input line 14. When the voltage of the power input line 14 thereafter becomes equal to or higher than a prescribed voltage, the power supply control circuit 5 connects the power input line 14 to the internal power supply line 15 and sends a memory backup protection signal at high level to the first chip selection signal input terminal S1 of the common memory 1 through the signal line 16.

Also, the clock signal and the reset signal are supplied from the terminal unit to the CLK port and the RESET port of the CPU 27, respectively. When reset release of the CPU 27 is effected after a predetermined period of time therefrom, the CPU 27 outputs gate control signals 31 and 33 at low level through the G1 port and the G3 port to set each of the gate circuit 7, the input buffer circuit 3 and the input/output buffer circuit 4 in a connected state, and outputs a gate control signal 32 at high level through the G2 port to set the gate circuit 6 in an isolated state. The CPU 27 also outputs the most significant bit address signal 28 at low level to the attribute memory 2 through the MSB port. All the other ports are set in the floating state.

The terminal unit is thereby enabled to perform reading/writing in the lower area AL of the attribute memory 2, while it is inhibited from accessing the upper area AH of the attribute memory 2 and the common memory 1. In this state, a secret code 39 is input from the terminal unit by using a keyboard, a key card, or the like. As shown in FIG. 2, the secret code 39 is written into the lower area AL of the attribute memory 2 with a predetermined address through a data bus 13, the input/output buffer circuit 4 and the memory data bus 22. After halving completed the cycle of writing the secret code 39, the terminal unit outputs the register signal at high level through the signal line 12. The CPU 27 is supplied with the register signal through the $\overline{REG}$ port and be informed of the completion of writing the secret code 39.

Then, the CPU 27 sets the gate control signals 31 and 33 output through the G1 port and the G3 port to high level to set the gate circuit 7, the input buffer circuit 3 and the input/output buffer circuit 4 in an isolated state. In this state, the CPU 27 outputs the chip selection signal at low level from the CE2 port to the terminal $\overline{S1}$ of the attribute memory 2 and outputs the output enable signal through the OE port to read the secret code 39 written in the attribute memory 2 through the memory data bus 22. Further, the CPU 27 sets the most significant bit address signal 28 to high level, thereby reading out the card identification code 40 previously stored in the upper area AH of the attribute memory 2, and compares the secret code 39 with the card identification code 40.

After the comparison, the CPU 27 sets the most significant address signal 28 to low level again and writes coincidence/non-coincidence information 41 representing the result of comparison in the lower area AL of the attribute memory 2 with a predetermined address, as shown in FIG. 2. If the card identification code 40 and the secret code 39 coincide with each other, a permission code designating permission to access the common memory 1 is written as coincidence/non-coincidence information 41. If the card identification code 40 and the secret code 39 do not coincide with each other, an inhibition code designating inhibition of access to the common memory 1 is written as coincidence/non-coincidence information 41.

Figure 5:
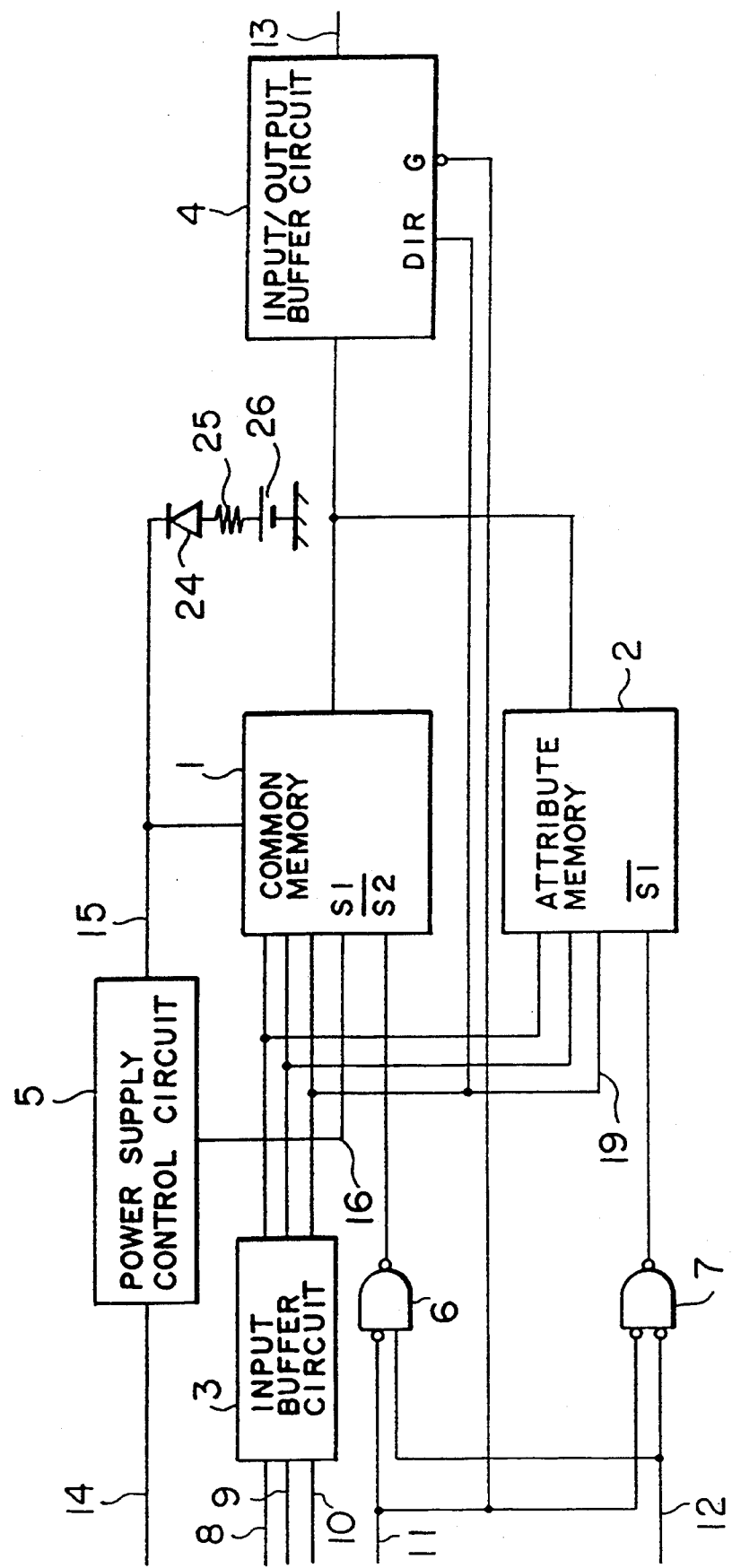
FIG. 5 is a block diagram of a conventional semiconductor data storage device.

Further, if the two codes coincide with each other as a result of the comparison, the CPU 27 sets all the gate control signals 31 to 33 output through the G1 to G3 ports to low level to set the gate circuits 6 and 7, the input buffer circuit 3 and the input/output buffer circuit 4 in the connected state, and sends the interrupt signal to the terminal unit through the INT port. The terminal unit is thereby enabled to access the common memory 1 or the attribute memory 2. The method of accessing from the terminal unit in this case is the same as that for the conventional storage device shown in FIG. 5 and, therefore, will not be described.

On the other hand, in the case of non-coincidence between the two codes, the CPU 27 sets the gate control signal 31 output through the G1 port to low level to set the gate circuit 7 in the connected state while maintaining the gate control signals 32 and 33 output through the G2 port and the G3 port at high level. Simultaneously, the CPU 27 also outputs the interrupt signal to the terminal unit. In this case, the terminal unit cannot access the common memory 1 or the attribute memory 2, since the input buffer circuit 3 and the input/output buffer circuit 4 are in the isolated state. That is, accessing from the terminal unit is inhibited unless the correct secret code is input.

In a case where the power supply from the terminal unit is stopped or the voltage of the power input line 14 is lower than the prescribed level, electrical power is supplied to the common memory 1 from the primary battery 26 through the excess current protection resistor 25, the reverse charge prevention diode 24 and the internal power supply line 15 to maintain data stored in the common memory 1. Since the attribute memory 2 is a non-volatile memory, data stored therein is not changed.

A non-volatile memory, such as an EEPROM, an FEEPROM, a mask ROM, or an OTPROM, may be used as the common memory 1. In such a case, the power supply control circuit 5, the reverse charge prevention diode 24, the excess current protection resistor 25 and the primary battery 26 for the backup operation are unnecessary.

Figure 3:
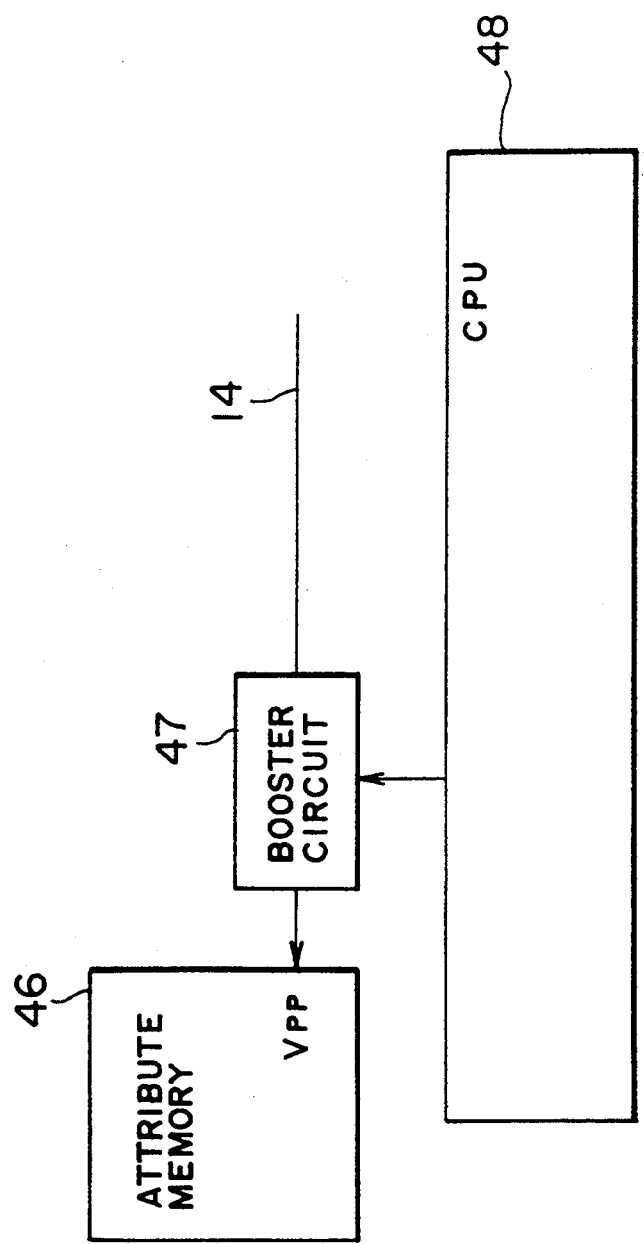
FIGS. 3 and 4 are block diagrams of portions of other embodiments of the present invention.

A 5 V single-power supply type FEEPROM, as well as EEPROM, may be used as the attribute memory 2. Also, the arrangement may be such that, as shown in FIG. 3, a power input line 14 is connected to a Vpp terminal of an attribute memory 46 through a booster circuit 47, and the booster circuit 47 is controlled by a CPU 48. In this a case, an OTPROM or a two-power supply type FEEPROM can be used as the attribute memory. For example, the booster circuit 47 directly outputs a 5 V voltage of the power input line 14 to the Vpp terminal of the attribute memory 46 when supplied with a low level control signal from the CPU 48, and boosts the 5 V voltage of the power input line 14 to 12 V and supplies this boosted voltage to the Vpp terminal of the attribute memory 46 when supplied with a high level control signal from the CPU 48.

Figure 4:
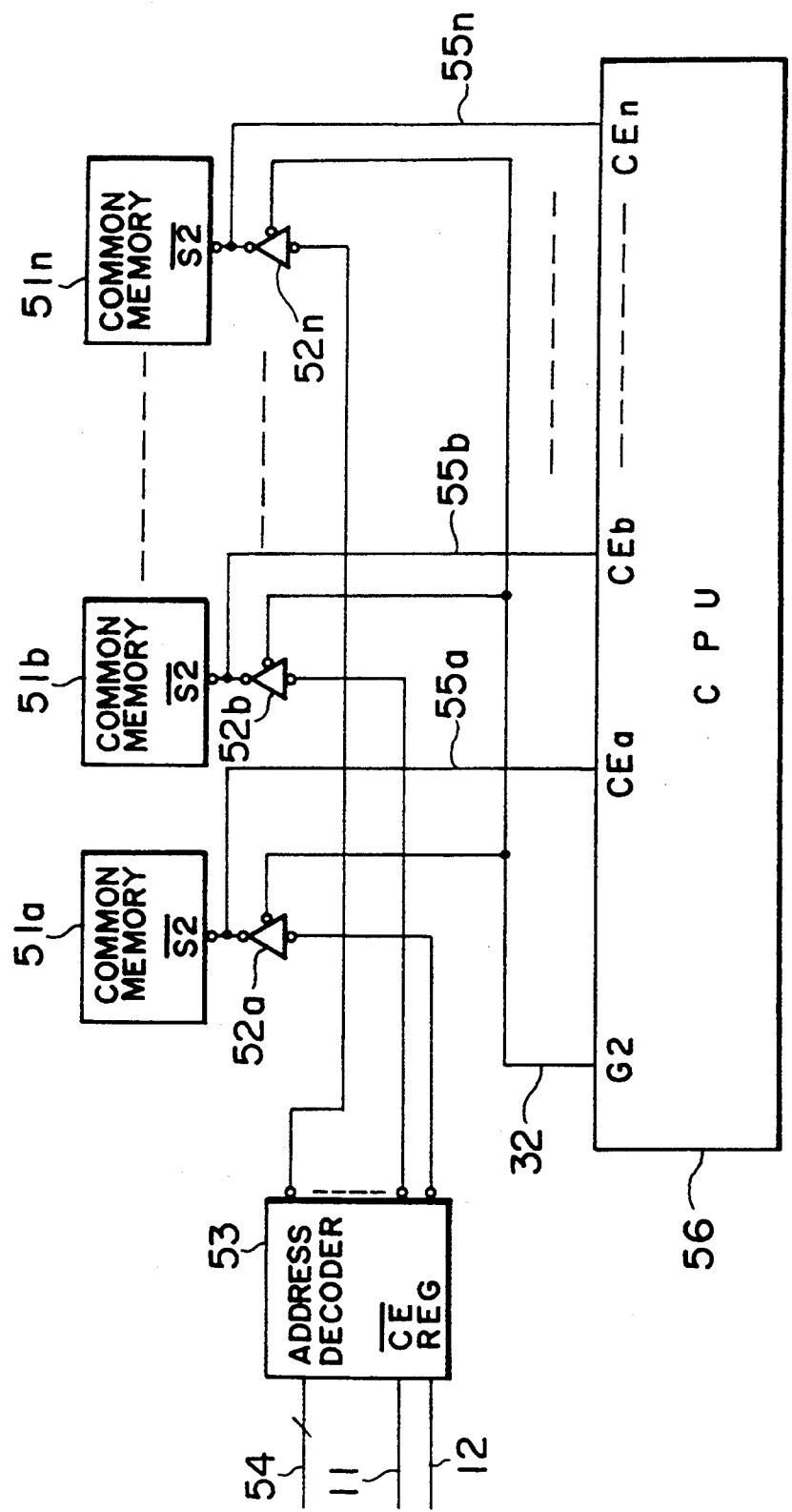

In the embodiment shown in FIG. 1, only one common memory 1 is provided. However, a plurality of common memories 51a to 51n may be provided as shown in FIG. 4. An address decoder 53 is connected to second chip selection signal input terminals $\overline{S2}$ of the common memories 51a to 51n through non-inverter circuits 52a to 52n, and a memory chip enable signal line 11, a register signal line 12 and a chip selection address signal line 54 are connected to the address decoder 53. One of the plurality of common memories 51a to 51n is selected on the basis of an address signal input through the address signal line 54, and a chip selection signal is output from the address decoder 53 to the input terminal $\overline{S2}$ of the selected common memory through the corresponding inverter circuit. The input terminals $\overline{S2}$ of the common memories 51a to 51n are independently connected to corresponding CEa to CEn ports of a CPU 56 to enable the CPU 56 to access each common memory selected as desired.

In the embodiment shown in FIG. 1, the CPU 27 accesses the attribute memory 2. Also, the common memory 1 may be accessed in the same manner. That is, even when the terminal unit is in a non-accessing state, the common memory 1 can be accessed by the CPU 27 in the data storage device. It is thereby possible to improve the overall processing efficiency of the data storage device system.

The data storage device in accordance with the present invention is used by being directly connected to the memory bus between the data storage device and a terminal unit, and therefore is compatible with the conventional data storage devices and has wide use. Although the portable data storage device is shown in FIG. 1, the present invention is not limited to a portable type and can be applied to any other types of data storage devices.

What is claimed is:

1. A method of controlling access to a data storage device comprising:
   storing an identification code in first region of an attribute memory incorporated in the data storage device;
   disconnecting a common memory of the data storage device from a terminal unit when a secret code is input to the data storage device from the terminal unit;
   storing the secret code in a second region of the attribute memory, separate from the first region of the attribute memory;
   comparing the second code and the identification code to each other; and
   connecting the common memory to the terminal unit to allow access to the common memory if the secret code and the identification code coincide with each other and maintaining the bus of the common memory and the terminal unit disconnected, inhibiting the terminal unit from accessing the common memory, if the secret code and the identification code do not coincide with each other.

2. The method of controlling access to a data storage device according to claim 1 wherein a most significant bit address signal indicates division of the attribute memory into the first region and the second region including prohibiting access by the terminal unit to the first region of the attribute memory.

3. A data storage device comprising:
   a common memory for storing processed data;
   an attribute memory having a first memory region in which an identification code is stored and a second memory region, separate from the first memory region, in which attribute data including common memory capacity and common memory access speed are stored;
   buffer means connected to said common memory and said attribute memory for controlling input of data to and output of data from said common memory and said attribute memory;
   control means connected to and controlling said common memory, said attribute memory, and said buffer means, said control means controlling said buffer means and said attribute memory, upon receipt of a secret code by said data storage device from a terminal unit, to store the second code in the second memory region of said attribute memory, to isolate and thereby prevent said buffer means from receiving additional data, to read the identification code and the secret code from said attribute memory, to compare the identification code and the secret code read from the attribute memory, to generate coincidence information indicating whether the identification code and the secret code coincide, and, if the identification code and the secret code do not coincide, continuing to isolate said buffer means, thereby denying access to said common memory by the terminal unit, and if the identification code and the secret code do coincide, connecting said buffer means to provide access to said common memory by the terminal unit for writing data into and reading data from said common memory.

4. The data storage device according to claim 3 wherein said control means receives a most significant bit address signal from said attribute memory indicating division between the first and second regions of said attribute memory for prohibiting access to the first region of said attribute memory by the terminal unit.

5. The data storage device according to claim 3 wherein said common memory comprises a volatile memory and said attribute memory comprises a nonvolatile memory.

6. The data storage device according to claim 3 wherein said buffer means includes an input buffer circuit connected to an address bus of said common memory and an address bus of said attribute memory, and an input/output buffer circuit connected to a data bus of said common memory and a data bus of said attribute memory.

7. The data storage device according to claim 3 comprising:
   a battery for supplying electrical power to said common memory; and
   a power supply control circuit for supplying electrical power from a terminal unit to said common memory and for supplying electrical power from said battery to said common memory when the power supply from the terminal is shut off.

8. The data storage device according to claim 3 wherein said control means controls said buffer means and said attribute memory to store the secret code in the second memory region of said attribute memory.

9. The data storage device according to claim 8 wherein said control means stores the coincidence information in the second memory region of said attribute memory.

10. The data storage device of claim 8 wherein said control means controls said buffer means to prohibit access by the terminal unit to the first memory region of said attribute memory.

* * * * *